United States Patent Office 3,311,638
Patented Mar. 28, 1967

3,311,638
ANHYDROPENICILLINS
Saul Wolfe, Syracuse, N.Y., assignor to Bristol-Myers Company, New York, N.Y., a corporation of Delaware
No Drawing. Filed Aug. 16, 1961, Ser. No. 131,719
13 Claims. (Cl. 260—306.7)

This invention relates to novel compounds which are hereinafter referred to as anhydropenicillins. More particularly, this invention relates to novel derivatives of penicillin compounds having the generic formula

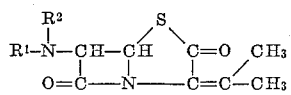

wherein $R^1$ and $R^2$ may be hydrogen, alkyl, aralkyl, acyl, carboalkoxy, carbobenzoxy, carboaryloxy, carbamyl, arylsulfonyl, alkylsulfonyl, and $R^1$ and $R^2$ taken together may be the radical of a Schiff base (i.e., $R^1$—CH= where $R^1$ is the same as previously defined) or the N-phthaloyl grouping, i.e.,

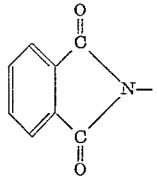

Another aspect of this invention relates to the novel methods of making and using such compounds. In the preferred series, $R^1$ is acyl and $R^2$ is hydrogen.

Cephalosporin C is an antibacterial agent which has been produced in limited quantities by the action of the cephalosporium mold. This compound, which has the formula

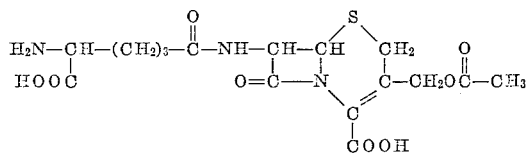

has valuable therapeutic properties since it is stable to the action of penicillinase and is also a competitive inhibitor of this enzyme; see Abraham and Newton, New penicillins, cephalosporin C, and penicillinase, Endeavour, pp. 92–100, April 1961. Thus, cephalosporin C acts synergistically with penicillin G against resistant staphylococci by hindering the destruction of the penicillin G. Moreover cephalosporin C has intrinsic activity against penicillin-resistant staphylococci identical with its activity against penicillin-sensitive strains. Since cephalosporin N, a penicillin which has the structure

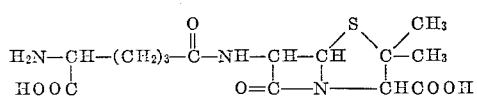

is not stable to penicillinase, it is presumed that the above-mentioned valuable therapeutic properties of cephalosporin C reside in the nucleus. Since new penicillins displaying a variety of therapeutic activities have been synthesized by adding different side chains to 6-aminopenicillanic acid, it would be extremely beneficial to be able to synthesize from available penicillins either cephalosporin C or compounds containing the cephalosporin C nucleus (i.e., the bicyclic ring system having the formula

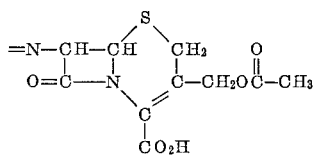

which has been named 7-aminocephalosporanic acid) as such or after replacement of the acetyl group with hydrogen.

It has now been discovered that anhydropenicillins having the generic formula

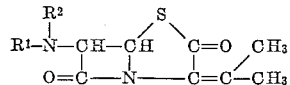

wherein $R^1$ and $R^2$ may be hydrogen, alkyl, aralkyl, acyl, carboalkoxy, carbobenzoxy, carboaryloxy, carbamyl, arylsulfonyl, alkylsulfonyl, and $R^1$ and $R^2$ taken together may be the radical of a Schiff base (i.e., $R^1$—CH= where $R^1$ is the same as previously defined) or the N-phthaloyl grouping, e.g.,

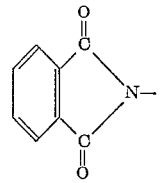

are useful as intermediates in the preparation of compounds containing the cephalosporin C nucleus. Since the methyl groups are now activated by the adjacent double bond, the introduction of a substituent (e.g., a halogen atom) is considerably easier than the introduction of the same substituent in the penicillin. Furthermore, the anhydropenicillins display extraordinary chemical stability in comparison with the stability of the penicillins (e.g., the anhydropenicillins may be recrystallized from boiling ethanol or refluxed without decomposition in aqueous dioxane). This increased chemical stability enables strenuous conditions to be employed for the introduction of the substituent without deleterious effects. Moreover, these anhydropenicillins possess significant muscle relaxant activity.

Therefore, it is a primary object of this invention to provide a new class of chemical compounds which are useful as intermediates in the preparation of cephalosporin C and compounds containing the cephalosporin C nucleus or another modified nucleus which may have novel biological properties. It is a further object of this invention to provide anhydropenicillins which possess significant muscle to provide processes for making such novel compounds.

These, and other objects, are accomplished by the practice of this invention which, briefly, comprises providing a new class of chemical compounds which are designated as anhydropenicillins. This new class of compounds has the generic formula

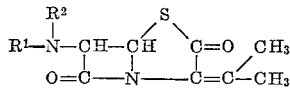

wherein R¹ and R² may be hydrogen, alkyl, aralkyl, acyl, carboalkoxy, carbobenzoxy, carboaryloxy, carbamyl, arylsulfonyl, alkylsulfonyl, and R¹ and R² taken together may be the radical of a Schiff base (i.e., R¹—CH= where R¹ is the same as previously defined) or the N-phthaloyl grouping, e.g.,

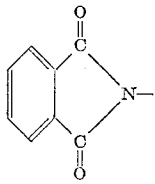

In the series where R¹ is acyl and R² is hydrogen, i.e., the true penicillins, R¹ is thus the residue obtained by the removal of the hydroxyl from the carboxyl group of an organic acid. Such acids include both substituted and unsubstituted alkanoic and aralkanoic acids in which the carbon chain may be interrupted by sulfur or oxygen. Such acids also include substituted and unsubstituted aromatic and heterocyclic acids, e.g., benzoic acid, furoic acid. Thus all the presently known penicillins are included. Among these are the many penicillins described in the United States patents and published South African patent applications listed below and in Belgian Patent No. 593,222.

In preferred embodiments of this invention, the grouping

taken together, may be H₂N—,

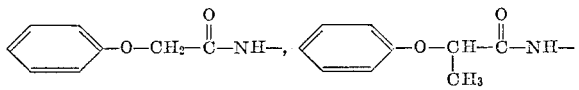

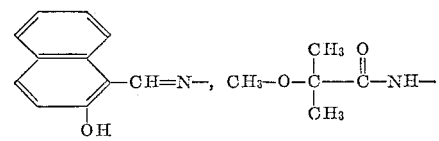

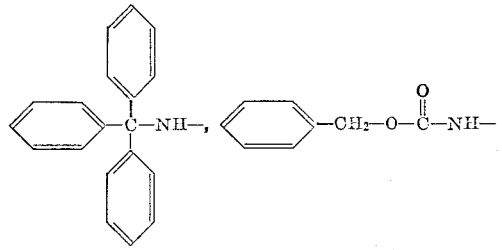

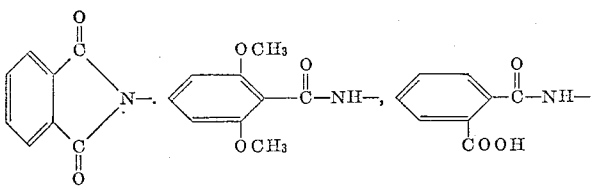

or

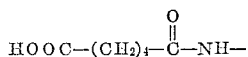

The preferred embodiment of the present invention has the structural formula

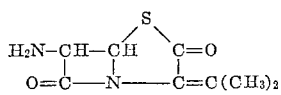

and is herein referred to as anhydro-6-aminopenicillanic acid.

The novel products of this invention may be produced by either one of two different processes. One process involves the reaction of the acid halide of a penicillin (see British Patent No. 758,653) with a reagent which will dehydrohalogenate the acid halide such as a tertiary amine (e.g., a tri(lower)alkylamine such as triethylamine). The acid halide of the penicillin may be obtained by any of the standard methods which are known for producing such acid halides such as by the reaction of the penicillin with a thionyl halide. Thionyl chloride is the preferred reagent for preparing such acyl halides of penicillin. The reactions which are involved in the production of anhydropenicillins by this method may be characterized by the following equations:

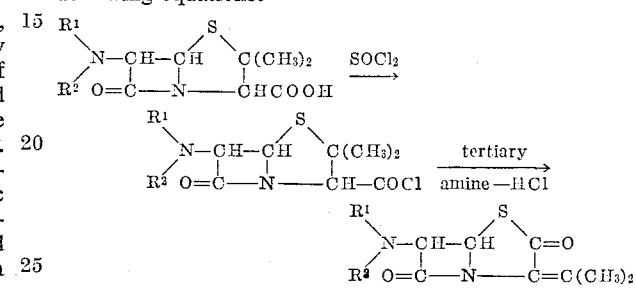

wherein R¹ and R² have values as previously described. It will be noted in the above equations that the final product differs empirically from the starting penicillin in the loss of H₂O. Therefore, it is designated as an anhydropenicillin.

The penicillins used as starting materials are prepared by reaction of the appropriate acylating agent with 6-aminopenicillanic acid according to one of the procedures described in United States Patents 2,941,995, 2,951,839 and 2,985,648 or in the published South African patent applications 3,827/59, 97/60, 2,006/60, 2,220/60, 2,276/60, 1,738/60 and 989/61 or in Belgian Patent No. 593,222.

It is preferred to conduct the reaction of the penicillin with thionyl halide in the presence of a solvent such as methylene chloride. Other solvents may also be used which will not deleteriously affect the reaction or the penicillin acid halide produced by the reaction. Reagents other than thionyl halides which are known to react with a carboxyl group to produce the corresponding acid halide may also be used. Since the reaction of thionyl halide with penicillin results in the liberation of hydrogen halide, it is preferred to conduct the reaction in the presence of an approximately equimolar amount of hydrogen halide acceptor such as pyridine or another tertiary amine. The temperature at which the reaction to form the penicillin acid halide is conducted is not critical and will depend to a large extent upon the nature of the reagent used to form the acid halide. When the reagent is thionyl chloride, it is preferred to conduct the reaction at below 0° C.—e.g., at between about —40° C. and about 0° C. The proportions of the reactants are not critical as long as the thionyl chloride is used in excess. It is preferred to use from about one to two moles of thionyl chloride per mole of penicillin. After the reaction has proceeded to completion, the penicillin acid halide may be diluted with anhydrous ether and recovered as a fluffy solid product by evaporation of the solvents in vacuo at 30–40° C. Alternatively, if the subsequent reaction is to be conducted in methylene chloride, the acid halide need not be isolated.

The penicillin acid halide is then reacted with a reagent, such as a tertiary amine and preferably triethylamine, which will dehydrohalogenate the acid halide. This reaction is preferably conducted in a non-reactive solvent such as methylene chloride. Although the temperature of the reaction is not critical, it is preferred to conduct this reaction at between about —40° C. and room temperature (i.e., about 25° C.). Also, the proportions of reactants are not critical. It is preferred to use an excess of tertiary amine over that required to react with the hydrogen halide given up by the penicillin in order to insure completeness of the reaction and to secure optimum yields. Thus, from about one to three moles of tertiary amine is generally used for each mole of penicillin acid halide.

After the reaction is complete, the solvent may be removed and the product recrystallized from ethanol or an acetone-water mixture to obtain pure anhydropenicillin.

The other method which may be used to obtain anhydropenicillin involves the reaction of a tertiary amine or an alkali metal alkoxide with a mixed anhydride of the penicillin. The production of mixed anhydrides of carboxylic acids is known. Briefly, the acid is treated with enough base, such as triethylamine, to form the salt and then with a reagent such as an alkyl chlorocarbonate or an organo sulfonyl chloride to form the mixed anhydride. The following equations exemplify this reaction:

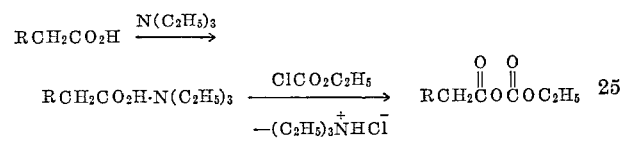

In preparing a mixed anhydride of a penicillin, a salt of the penicillin, such as the potassium, sodium or triethylamine salt, is reacted with a reagent such as an alkyl halocarbonate (e.g., ethyl chloroformate) or an organo (preferably alkyl or aryl)-sulfonyl chloride (e.g., p-toluenesulfonyl chloride or methanesulfonyl chloride). The reaction may be represented as follows:

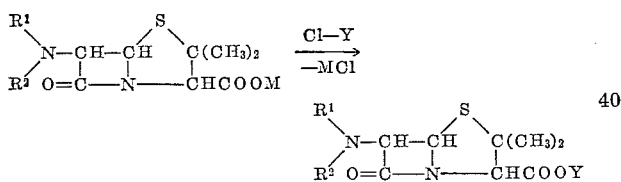

wherein $R^1$ and $R^2$ may be radicals as previously described; M is a cation such as potassium, sodium or the triethylamino radical; and Y represents an alkyl carbonate or an organo (preferably alkyl or aryl) sulfonyl group—i.e., Y may be, for example, $-COOCH_2CH_3$,

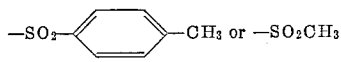

The reaction is preferably conducted in the presence of a non-reactive solvent such as methylene chloride. The reaction conditions may vary widely and are not critical. Thus, the temperature may range from about $-30°$ C. up to the reflux temperature of the solution. The proportions may also be varied widely. It is preferred to use from one to two moles of the anhydride forming reagent per mole of penicillin salt.

After the mixed anhydride of the penicillin has been prepared, it is reacted with a tertiary amine, preferably triethylamine, or an alkali metal alkoxide, preferably sodium methoxide. It is preferred that the reaction be conducted in the presence of a solvent such as methylene chloride. The temperature at which the reaction is conducted may vary between about $-40°$ C. and the reflux temperature of the solution. The proportions of reactants may also be varied widely. It is preferred that from about one-half to two moles of tertiary amine or alkali metal alkoxide per mole of the penicillin mixed anhydride be used. After the reaction is complete, pure anhydropenicillin may be recovered by removal of the solvent and recrystallization of the product.

Any penicillin compound may be used in the previously described processes to obtain anhydropenicillins. More particularly, the 6-aminopenicillanic acids which may be used may be represented by the formula

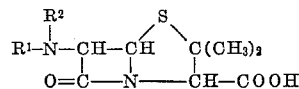

wherein $R^1$ and $R^2$ may be hydrogen, alkyl, aralkyl, acyl, carboalkoxy, carbobenzoxy, carboaryloxy, carbamyl, arylsulfonyl, alkylsulfonyl, and $R^1$ and $R^2$ taken together may be the radical of a Schiff base (i.e., $R^1$—CH= where $R^1$ is the same as previously defined) or the N-phthaloyl grouping, e.g.,

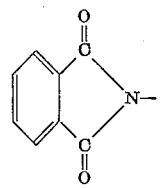

In preferred embodiments, the grouping

taken together, in the above formula may represent the radicals $H_2N-$,

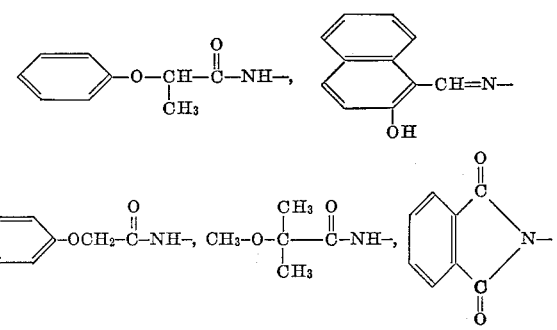

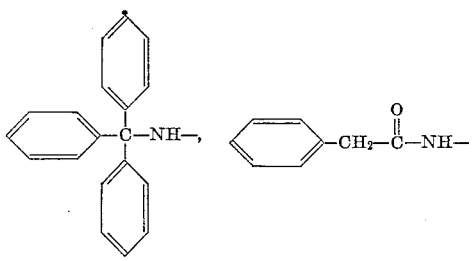

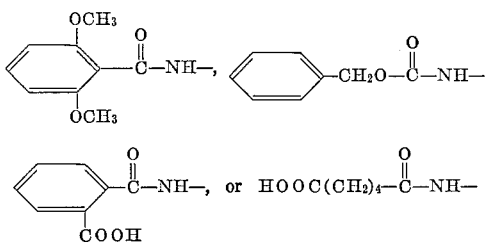

As previously mentioned, the novel compounds of this invention are valuable intermediates in the preparation of compounds containing the cephalosporin C nucleus. One way by which these compounds may be prepared is by (1) the allylic bromination of the anhydropenicillin to form bromoanhydropenicillin followed by (2) cyclization by treatment with a suitable reagent to form a compound containing the cephalosporin C nucleus. This sequence of steps may be represented by the following equations:

The reagent which may be used to treat the bromoanhydropenicillin may be varied widely. The selection of the reagent will depend upon the nature of the substituent—Y in the above equations which is desired. A partial list of such reagents and the radical W produced by each reagent is set out in Table I.

TABLE I

| | Class | Example | Substituent (W) |
|---|---|---|---|
| 1 | Acetates: | | |
| | (a) | Silver acetate in acetic acid | |
| | (b) | Silver acetate in pyridine | —OCOCH₃ |
| | (c) | Potassium acetate in glacial acetic acid | |
| | (d) | Silver acetate in anhydrous ether, tetrahydrofuran, benzene or other essentially neutral solvent. | |
| 2 | Metal hydroxides | KOH (2 moles) | —OH |
| 3 | Metal alkoxides | Sodium methoxide in CH₃OH | —OCH₃ |
| 4 | Amines, primary: | | |
| | (a) | Cyclohexylamine | —NHC₆H₁₁ |
| | (b) | Aniline | —NHC₆H₅ |
| 5 | Amines, secondary | Piperidine | —NC₅H₁₀ |
| 6 | Amines, Tertiary: | | |
| | (a) | 8-hydroxyquinoline | Quat. salt. |
| | (b) | Hexamethylenetetramine | Do. |
| 7 | Amino acids: | | |
| | (a) | Glycine | —NH—CH₂—CO₂H |
| | (b) | Lysine | —NH(CH₂)₄—CH—CO₂H  \|  NH₂ |
| | (c) | Glutamic acid | —NH—CH—(CH₂)₂—CO₂H  \|  CO₂H |
| 8 | Cyanides: | | |
| | (a) | Cuprous cyanide | —CN |
| | (b) | Sodium cyanide in aqueous alcohol | —CN |
| 9 | Thiocyanates | Sodium thiocyanate | —SCN and —NCS |
| 10 | Phenols (salts of) | Sodium phenoxide | —OC₆H₅ |
| 11 | Metals: | | |
| | (a) | Zinc dust plus acetic acid | —H |
| | (b) | Magnesium in tetrahydrofuran | Coupling. |
| 12 | Mercaptans (salts) | Sodium thioglycolate | —SCH₂—CO₂H |
| 13 | Hydrazines | Dinitrophenylhydrazine |  |
| 14 | Imides | Potassium phthalimide in dimethylformamide | |

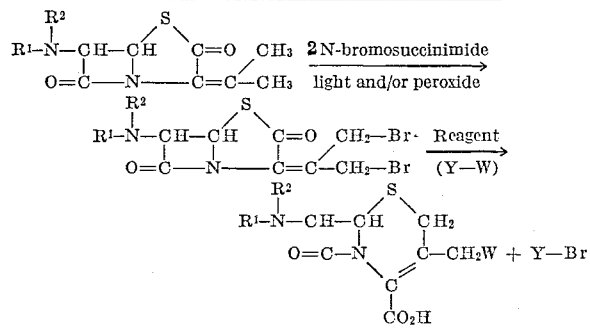

wherein $R^1$ and $R^2$ have the values previously described and W is a radical derived from the reagent. The final product may be reacted with an amine to remove the radical W and quaternize the —CH₂— group.

The reaction of N-bromosuccinimide with the anhydropenicillin is preferably conducted in the presence of an inert solvent such as methylene chloride or carbon tetrachloride. A peroxide such as benzoyl peroxide or light or both may be used to catalyze the reaction. When two or more moles of N-bromosucciniamide per mole of anhydropenicillin are used allylic bromination occurs and may be detected by the formation of an intense and very characteristic red to greenish color with pyridine. Depending on the nature of the grouping $$R^1-N-\underset{R^2}{|}$$

bromination may also occur in the side chain under the conditions of allylic bromination.

Another method for the conversion of anhydropenicillins into compounds containing the deacetylated cephalosporin C nucleus is enzymatic action to cause allylic hydroxylation. This type of action may be represented as follows:

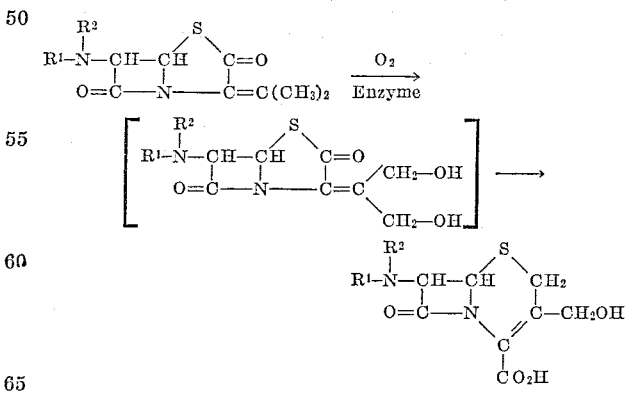

Examples of enzymes which may be used include those of *Rhizopus arrhizus*, *Aspergillus niger*, *Cephalothecium roseum*, *Rhizopus reflectus*, *Rhizopus nigricans*, *Mucor corymbifer*, *Aspergillus nidulans*, *Streptomyces fradiae*, *Lenzites abietina*, *Cunninghamella blakesleenana*, *Helicostylum piriforme* and *Proactinomyces roseus*.

An additional use of the anhydropenicillins of the present invention is as reagents for reaction with mercuric acetate in a solvent such as benzene to produce new antimicrobial agents, e.g., according to the following equation:

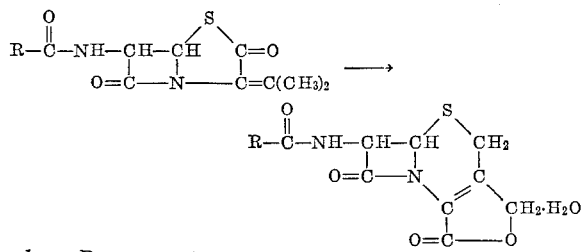

where R represents

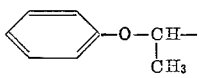

Anhydrotrityl-6-aminopenicillanic acid is particularly useful for the preparation of the anhydropenicillin nucleus itself, as by treatment with a slight excess of anhydrous hydrogen chloride in ether-dioxane according to the following equation:

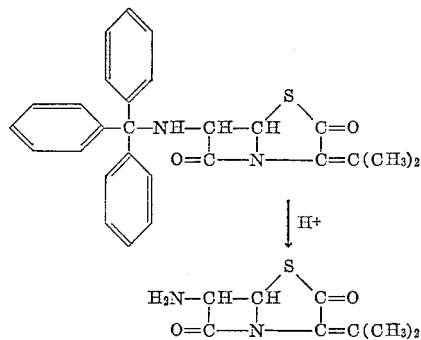

In addition to their use as intermediates in the preparation of biologically active compounds, the novel compounds of this invention have also been found to be valuable muscle relaxants. For example, an intraperitoneal dose of 1000 micrograms per kilogram of body weight of anhydro-alpha-phenoxyethylpenicillin exerted significant generalized muscle relaxant activity. Two hours after administration, the muscle relaxant score was 16. When the dose was raised to 2000 micrograms per kilogram of body weight, a muscle relaxant score of 12 resulted two hours after administration. These dosages produced no undesirable central nervous system stimulant or depressant effects and did not adversely affect blood clotting time.

The following examples illustrate the best modes contemplated for carrying out this invention.

Examples I and II illustrate the production of anhydro-alpha-phenoxyethylpenicillin via the acid chloride of alpha-phenoxyethylpenicillin.

*Example I*

A mixture of 100.0 grams (0.25 mole) of potassium alpha-phenoxyethylpenicillin, 35.0 grams (0.25 mole) of triethylamine hydrochloride and one liter of methylene chloride was stirred for one hour at room temperature (25° C.). Twenty ml. (0.25 mole) of pyridine was added and the solution was cooled to −30° C. There was then added 24.5 ml. (0.30 mole) of thionyl chloride with rapid stiring and the mixture was stirred at −25° C. to −30° C. for one hour. To the resulting bright orange solution there was added 70.0 ml. (0.50 mole) of triethylamine. The mixture was stirred for 10 minutes at −30° C., then warmed rapidly to room temperature and quenched with 30 ml. of glacial acetic acid. The solution was washed with two 150 ml. portions of water and dried over anhydrous $Na_2SO_4$. It was filtered into 4 liters of anhydrous ether, treated with charcoal and filtered again. The solvent was removed from the filtrate leaving a dark gum. This residue was dissolved in 100 ml. of absolute ethanol and the solution chilled to yield 20.4 grams of yellow crystals. This amounted to a 23% yield of crude product. The yellow crystals were recrystallized from boiling ethanol containing charcoal to yield 18.8 grams of pure product having a melting point of 148° C. to 150° C. This amounted to a yield of 21.7%. The final product, designated as anhydro-alpha-phenoxy-ethylpenicillin, had the formula

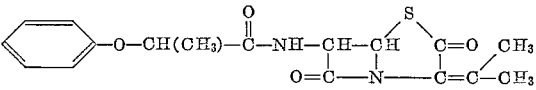

In the ultraviolet spectrum this product in chloroform exhibited λ max. 269 mμ (E, 11,000). The molecular weight was found to be 382 by the Signer method.

*Analysis.*—Calc'd for $C_{17}H_{18}N_2O_4S$: C, 59.0; H, 5.21; N, 8.10; S, 9.25. Found: C, 59.16; H, 5.25; N. 8.31; S, 8.56.

Ozonolysis of this product (99 mgm.) and treatment of the mixture with 2,4-dinitrophenylhydrazine reagent gave 35 mgm. of acetone dinitrophenylhydrazone, melting at 123.0–124.0° C. and having an infrared spectrum identical in all respects to that of authentic acetone dinitrophenylhydrazone.

Anhydro-alpha-phenoxyethylpenicillin was recovered unchanged and quantitatively after irradiation of a solution in benzene containing a trace of iodine at 65° C. with a photoflood lamp for twelve hours or with a Hanovia 100 watt mercury arc for thirty minutes and after refluxing a mixture with 5% palladium on charcoal in dioxane for eighteen hours, in toluene for two hours or in xylene overnight.

Anhydro-alpha-phenoxyethylpenicillin exhibits strong β-lactam and amide carbonyl absorption in the infrared spectrum and very little antimicrobial activity. In addition, the infrared spectrum shows strong bands at 5.95μ (C=O) and 6.1μ (C=C). The structure given above has been confirmed by nuclear magnetic resonance spectrum analysis.

*Example II*

The procedure of Example I was repeated with the sole exception that 12.3 ml. (0.15 mole) of thionyl chloride was used instead of 24.5 ml. as in Example I. The final yield of anhydro-alpha-phenoxyethylpenicillin was 19.5%.

Examples III to V illustrate the preparation of anhydropenicillin via mixed anhydrides derived from alpha-phenoxyethylpenicillin.

*Example III*

A suspension of 0.10 mole of potassium alpha-phenoxyethylpenicillin in 600 ml. of methylene chloride was prepared. To this suspension there was added dropwise with stirring a mixture of 50 ml. of methylene chloride and 0.1 mole of methanesulfonyl chloride. After the addition was complete, the mixture was refluxed overnight. The mixed anhydride thus obtained had the formula

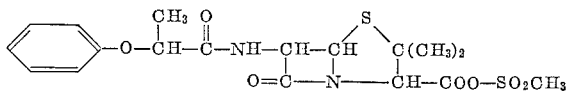

The reaction mixture was then cooled to 0° C. and 0.10 mole of triethylamine in 50 ml. of methylene chloride was added dropwise over a period of 45 minutes. The color of the mixture changed from yellow to dark brown. It was then stirred at 0° C. for one hour and at 30° C. for two hours. The reaction mixture was washed with 200 ml. of water and the methylene chloride layer was separated and dried over anhydrous $Na_2SO_4$. It was then poured into 3 liters of dry ether containing charcoal. This solution was filtered and the solvent was removed leaving a residual oil. The oil was dissolved in 20 ml.

of absolute ethanol and allowed to stand for 48 hours in a cold room. A precipitate of 2.0 grams of pure anhydro-alpha-phenoxyethylpenicillin was obtained.

*Example IV*

A mixture of 40.3 grams of potassium alpha-phenoxyethylpenicillin (0.10 mole), 13.8 grams of triethylamine hydrochloride (0.10 mole) and 400 ml. of methylene chloride was stirred for one hour at 26° C. to complete the metathesis to the soluble alpha-phenoxyethylpenicillin triethylamine salt. The equilibrium is displaced by the precipitation of KCl. The solution was cooled to 0° C. and 9.52 ml. (0.10 mole) of ethylchloroformate was added dropwise in the course of 5 minutes. The mixture was stirred for 15 minutes at 0° C. to complete the formation of the penicillin mixed anhydride. There was then added 14.1 ml. (0.100 mole) of triethylamine in 50 ml. of methylene chloride over the course of one hour at −3° C. The resulting yellow solution was stirred at −3° C. for an additional two hours. Then 11.4 ml. (0.20 mole) of glacial acetic acid in 50 ml. of methylene chloride was slowly added during a period of 10 minutes, the temperature of the mixture being maintained at below 0° C. by means of a cooling bath. The mixture was then rapidly raised to a temperature of 27° C. and was held at that temperature, with stirring for 35 minutes. The reaction mixture was washed with 200 ml. of water, dried, filtered, and the solvent was removed from the filtrate by distillation in vacuo at 41° C. leaving the product, anhydro-alphaphenoxyethylpenicillin, as an orange-brown transparent gum. The product was recrystallized from absolute ethanol. There was obtained 1.77 grams of anhydro - alpha - phenoxyethylpenicillin, M.P. 146–148° C.

*Analysis.*—Calc'd for $C_{17}H_{18}N_2O_4S$: C, 59.0; H, 5.21; N, 8.10; S, 9.25. Found: C, 58.65; H, 5.47; N, 8.63; S, 9.13.

*Example V*

A mixture of 40.3 grams (0.10 mole) of potassium alpha-phenoxyethylpenicillin and 19.1 grams (0.10 mole) of p-toluenesulfonyl chloride in 550 ml. of methylene chloride was stirred for 16 hours at 30° C. to 31° C. A precipitate of KCl was formed. The mixed anhydride was thus obtained. A solution of 14.1 ml. (0.10 mole) of triethylamine in 50 ml. of methylene chloride was added during 20 minutes, while the temperature of the reaction mixture spontaneously rose to 34.0° C. and the color changed from colorless to black-green. The mixture was stirred for 7 hours at 30° C. and was then washed with 200 ml. of water, dried over $Na_2SO_4$, filtered and flashed dry at 40° C. The gummy residue was triturated with 100 ml. of absolute ethanol. The trituration was allowed to stand at 5° C. for 24 hours. There was then obtained by filtration 4.10 grams of anhydro-alpha-phenoxyethylpenicillin, M.P. 140–144° C.

The following example illustrates the use of anhydro-alpha-phenoxyethylpenicillin as an intermediate in the preparation of a compound containing the cephalosporin C nucleus.

*Example VI*

A mixture comprising 10.38 grams (0.03 mole) of anhydro-alpha-phenoxyethylpenicillin, 21.36 grams of N-bromosuccinimide and 726 mg. (0.0003 mole) of benzoyl peroxide was refluxed for 3 hours in 400 ml. of $CCl_4$. The mixture was filtered, washed with a 10% solution of $NaHCO_3$ and cooled. The product obtained weighed 1.3 grams, M.P. 106° C., and was inactive antibacterially at 100 mcg./ml. A mixture of 331 mg. of this product with 25 ml. of methylene chloride, 79 mg. of pyridine, 1.0 gram of $Na_2CO_3$ and 25 ml. of water was shaken well. The mixture turned black and an emulsion was formed. After 5 hours, the lower layer which formed was filtered through diatomaceous earth (Celite) and the filtrate was allowed to evaporate to dryness. The residue which remained as a solid was found to inhibit the growth of a strain of *S. aureus* at a concentration of less than 1 mcg./ml.

*Example VII*

This example shows the formation of a crystalline modification of anhydro-alpha-phenoxyethylpenicillin. Twenty mg. of the product obtained in Example I was heated to 161° C., held at that temperature for three minutes and allowed to cool. The melt solidified as long curled needles rather than the original prismatic rods. Its infrared spectrum disclosed that no chemical alteration had occurred, the only change being in its crystalline form. This crystalline modification could be heated up to 200° C. with no change being observed. Above 200° C. it slowly began to decompose.

The following examples illustrate the preparation of other anhydropenicillins:

*Example VIII*

A mixture of 37.2 grams of potassium penicillin G (potassium benzylpenicillin), 8.9 ml. of pyridine and 250 ml. of methylene chloride was cooled to −20° C. and 8 ml. of thionyl chloride was added over a period of 2 minutes. The mixture was stirred for 3 hours at −20° C. and then cooled to −30° C. There was added 34 ml. of triethylamine over a period of 15 minutes. The temperature was allowed to rise to −20° C. over a period of ½ hour and the mixture aws maintained at −20° C. for an additional 1½ hours. The temperature was then allowed to rise gradually to 0° C. over a period of 1 hour. The reaction mixture was washed with 250 ml. of water and the solvent was removed from the organic phase. The black sticky mass which resulted was diluted with about 200 ml. of ethanol and the mixture was stored overnight in a cold room. Filtration and subsequent recrystallization from acetone and water yielded 2.42 grams of anhydrobenzylpenicillin. This compound has the formula

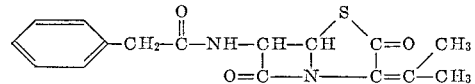

and melted at 156–158° C. (d).

*Analysis.*—Calc'd for $C_{16}H_{16}N_2O_3S$: C, 60.74; H, 5.02; N, 8.855. Found: C, 60.82; H, 5.17; N, 8.85.

*Example IX.—Preparation of the potassium salt of 6-(α-methoxyisobutyramido)penicillanic acid*

α-Methoxyisobutyric acid (0.1 mole; 11.8 g.) is dissolved in a mixture of 20 ml. of acetone and 80 ml. of dioxane. While the solution is stirred and cooled, 15 ml. of triethylamine is added. The resulting cold solution (ca. −5° C.) is then slowly treated with a solution of isobutyl chloroformate (0.1 mole; 13.6 g.) in 15 ml. of dioxane, the temperature of the reaction mixture being kept below 5° C. throughout the addition. A solution of 6-aminopenicillanic acid (0.1 mole; 21.6 g.) in 100 ml. of water and 15 ml. of triethylamine is then added rapidly to the above acylating mixture with the temperature being maintained below 10° C., and the resulting clear solution is stirred in the cold for thirty minutes and thereafter at room temperature for about 2 hours. After the foregoing treatment, the reaction mixture is diluted with an equal volume of water and extracted twice with ether to remove unreacted reagents and the ether extracts are discarded. The water layer is then separated, covered with 300 ml. of ether, cooled, and acidified to pH 2 with dilute sulfuric acid. The ether layer in which the product is contained is then separated, washed twice with cold water, dried over anhydrous sodium sulfate, filtered, and treated with 50 ml. of a 40% solution of potassium 2-ethylhexanoate in n-butanol whereupon the product, the potassium salt of 6-(α-methoxyisobutyramido)penicillanic acid, is precipitated and collected by filtration.

After trituration with ether this potassium salt is dried at room temperature in vacuo over $P_2O_5$, recovered as a water-soluble white crystalline powder which is found to weigh 24.5 g., to decompose at 234–236° C., to contain the β-lactam structure as shown by infrared analysis, to inhibit *Staph. aureus* Smith at a concentration of 1.6 mcg./ml. and to exhibit versus *Staph. aureus* Smith at a concentration of 1.6 mcg./ml. and to exhibit versus *Staph. aureus* Smith upon intramuscular injection in mice a $CD_{50}$ of 1.8 mcg./kg.

A mixture of 80 ml. of methylene chloride, 6.33 grams of 2-methoxyisopropyl penicillin

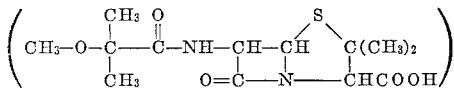

and 2.67 ml. of triethylamine was cooled to 0° C. To this cooled mixture, there was added 1.90 ml. of ethyl chloroformate dissolved in 20 ml. of methylene chloride. Subsequently, 2.2 grams of sodium methoxide were added. After 2½ hours, 100 cc. of one molar $$Na_2HPO_4—NaH_2PO_4$$

buffer solution (pH 6.0) was added and the mixture was vigorously shaken. The methylene chloride layer was separated and the buffer was extracted with 50 ml. of methylene chloride. The combined methylene chloride solutions were extracted with water and the aqueous solution was acidified with 6 N sulfuric acid to pH of 2.3. The solution was extracted with ether and the methylene chloride solution was then dried with $Na_2SO_4$, filtered and flashed dry, leaving a yellow gum. This was subsequently dried to a yellow, fluffy product which was determined by spectroscopic analysis to be anhydro-2-methoxyisopropylpenicillin. The product had the formula

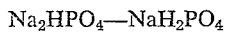

*Example X*

To a suspension of 18.5 grams of the Schiff base of 6-aminopenicillanic acid having the structure

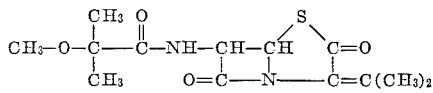

in 200 ml. of methylene chloride there was added, with stirring, 8.8 ml. of pyridine and 7 ml. of triethylamine. A clear solution was obtained. After cooling to —20° C., 3.9 ml. of thionyl chloride were added and the solution was stirred for 3 hours at —15° to —20° C. While the temperature was maintained at —15° to —20° C., 14 ml. of triethylamine in 30 ml. of methylene chloride was added dropwise with stirring. The reaction mixture was concentrated to dryness in a flash evaporator. The residual crystalline solid was washed with ethanol and was then recrystallized from an acetone-water mixture. The white product obtained had the general formula

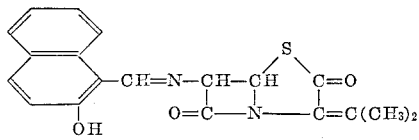

and probably exists in the form of the structure

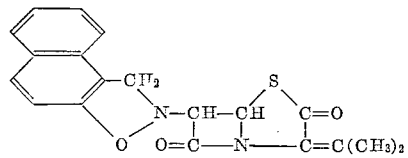

as it is colorless and the ultraviolet spectrum does not show the —CH=N— chromophore.

*Analysis.*—Calc'd for $C_{19}H_{16}N_2O_3S$: C, 64.77; H, 4.54. Found: C, 64.47; N, 4.71.

*Example XI*

N-phthaloyl-6-aminopenicillanic acid was prepared by reacting equimolar amounts of 6-aminopenicillanic acid and N-carbethoxyphthalimide in an aqueous medium and in the presence of $NaHCO_3$. The product was extracted with methylene chloride and the crystalline solid which was obtained after evaporation of the methylene chloride was recrystallized from a water-acetone mixture, M.P. 178–180° C.

*Analysis.*—Calc'd for $C_{16}H_{14}N_2O_5S$: C, 55.49; H, 4.05. Found: C, 55.37; H, 4.15.

There were added 8.8 ml. of pyridine to a solution of 17.3 grams of N-phthaloyl-6-aminopenicillanic acid in 200 ml. of methylene chloride. The solution was cooled to —20° C. and 3.9 ml. of thionyl chloride in 30 ml. of methylene chloride was added. The temperature rose spontaneously to —10° C. and then dropped back to —20° C. The solution was stirred for 3 hours while the temperature was maintained at —20° to —15° C. and 21 ml. of triethylamine in 60 ml. of methylene chloride were added dropwise. The reaction mixture was quenched with 25 ml. of glacial acetic acid and the methylene chloride solution was evaporated to dryness. The dark brown residue was recrystallized from an acetone-water mixture. The product had a melting point of 236–237° C. The formula of the product was

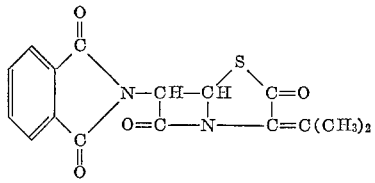

*Analysis.*—Calc'd for $C_{16}H_{12}N_2O_4S$: C, 58.53; H, 3.66. Found: C, 58.84; H, 3.87.

*Example XII*

Triethylamine (5 ml.) was added slowly to 1.08 gm. (0.005 mole) of 6-aminopenicillanic acid suspended in 5 ml. dimethylformamide in an ice-bath. Phthalic anhydride (0.76 gm., 0.00505 mole) in 5 ml. dimethylformamide was added dropwise with stirring. The mixture was then stirred one hour at 0° C. and three hours at room temperature, filtered and diluted to the cloud point with diethyl ether to precipitate crystalline triethylammonium 6-(2-carboxybenzamido)penicillanate, 1.2 gm., M.P. 137–139° C. (d), which was soluble in water and, in dimethylformamide, inhibited *Staph. aureus* Smith at a concentration of 5 mcg./ml. and was only 50% inactivated by penicillinase (10 μ/ml.) under conditions which inactivated benzylpenicillin to an extent greater than 99.5%.

*Analysis.*—Calc'd for $C_{16}H_{16}N_2O_6S \cdot (C_2H_3)_3N$: C, 56.7; H, 6.73. Found: C, 56.4; H, 7.18.

A mixture of 9.31 grams of the triethylamine salt of 2-carboxyphenylpenicillin

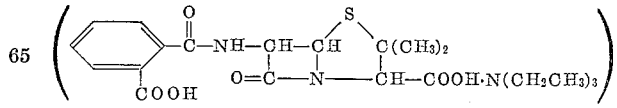

and 8.4 ml. of triethylamine in 100 ml. of methylene chloride was cooled to —20° C. and 2.88 ml. of thionyl chloride in 20 ml. of methylene chloride was added thereto. The mixture was stirred for 2¾ hours at —20° C. and 8.4 ml. of triethylamine in 30 ml. of methylene chloride was added over a 30 minute period. The mixture was stirred and allowed to warm to room temperature during the next 15 hours. The mixture was emulsified on shaking with 500 ml. of water. The emulsion was then broken by centrifuging, the organic phase was separated, dehydrated over sodium sulfate and evaporated to dryness to yield 5.0 grams of product which was identified by its spectroscopic properties as anhydro-2-carboxyphenylpenicillin having the structure

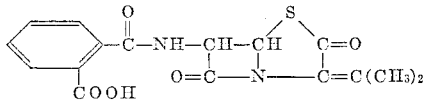

*Example XIII*

A mixture of 5.09 grams of the potassium salt of ω-carboxybutylpenicillin (see Example 11, U.S. Patent 2,941,995)

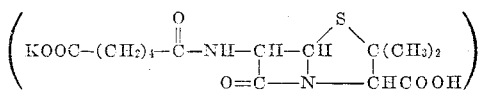

and 1.92 ml. of pyridine in 50 ml. of methylene chloride was cooled to —20° C. and 1.72 ml. of thionyl chloride in 10 ml. of methylene chloride was added. The mixture was stirred for 4 hours at —20° C. and then 0.96 ml. of pyridine followed by 0.86 ml. of thionyl chloride in 10 ml. of methylene chloride were added. The mixture was stirred for 30 minutes and then 3.3 ml. of triethylamine in 30 ml. of methylene chloride were added. The mixture was stirred overnight at room temperature and was subsequently diluted with ether and filtered. The filtrate was evaporated to dryness and the residue was shaken with a mixture of water and ether containing 10% by weight of methylene chloride. The organic layer was dried over sodium sulfate and treated with 4.3 ml. of 2.75 molar alcoholic potassium hydroxide to yield 0.40 gram of black precipitate. The product was determined to be anhydro-ω-carboxybutylpenicillin on the basis of its spectroscopic properties.

*Example XIV*

A mixture of 6.3 grams of the sodium salt of 2,6-dimethoxyphenylpenicillin

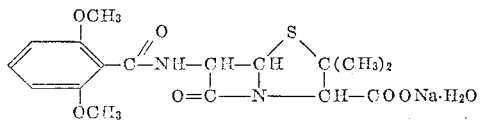

and 5.76 ml. of pyridine in 130 ml. of methylene chloride was cooled to —20° C. and 2.61 ml. of thionyl chloride was added. The mixture was stirred for 4½ hours at —20° C. and then 3.5 ml. of triethylamine hydrochloride in 30 ml. of methylene chloride was added over a 15 minute period. The mixture was stirred while warming to room temperature for 16 hours and then diluted with ether. The solution was filtered and the filtrate was evaporated to dryness. The residue was recrystallized from ethanol which was cooled in Dry Ice to yield 0.80 gram of anhydro-2,6-dimethoxyphenylpencillin having the structure

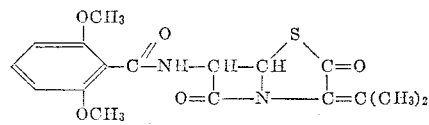

*Example XV*

By following the procedure of Examples VIII through XIV using as the starting material a penicillin having in its acid form the structure

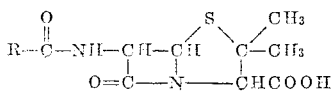

there were produced solid anhydropenicillins having, as confirmed by spectroscopic analysis, the structures

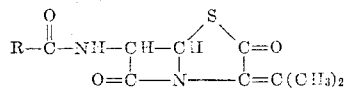

where R represented hydrogen,

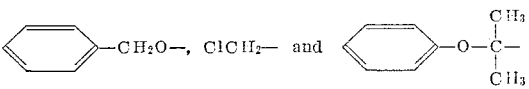

respectively.

*Example XVI.—N-trityl-6-aminopenicillanic acid*

In a mixture of water (40 ml.) and isopropyl alcohol (80 ml.) containing 30 ml. (0.3 mole) diethylamine there was dissolved 21.6 g. (0.1 mole) 6-aminopenicillanic acid. Trityl chloride (triphenylchloromethane, 36 g., 0.13 mole) was finely powdered and added in portions over 90 minutes with vigorous stirring. Half-way through this addition an additional 100 ml. isopropyl alcohol and 40 ml. water was added. The suspension was stirred at room temperature for 24 hours and then filtered to remove a solid which was presumably triphenylmethylcarbinol. The solid was washed with 50 ml. isopropyl alcohol and the combined filtrates were then diluted with water to precipitate an oil which crystallized rapidly and was collected by filtration and discarded.

The addition of 25 ml. acetic acid to the filtrate precipitated N-trityl-6-aminopenicillanic acid as a viscous mass which was separated by decantation, washed several times with water and dissolved in acetone-ether. This solution was washed with water to remove the acetone, dried over anhydrous $Na_2SO_4$ and filtered. The addition of 36 ml. (0.1 mole) of 50% potassium 2-ethylhexanoate in n-butanol precipitated hydrated potassium N-trityl-6-aminopenicillanate which was collected, pressed dry, washed with ether, dried in vacuo over $P_2O_5$ and found to weigh 12.7 g.

*Analysis.*—Calc'd for $C_{27}H_{25}N_2O_3SK \cdot H_2O$: C, 63.2; H, 5.4; N, 5.45. Found: C, 63.03; H, 5.67; N, 4.54.

One gram of this hydrate was dissolved in 30 ml. of water. After diluting with 300 ml. n-butanol, the water was removed azeotropically to give the anhydrous potassium salt.

*Analysis.*—Calc'd for $C_{27}H_{25}N_2O_3SK$: C, 65.08; H, 5.67; N, 5.34. Found: C, 65.2; H, 5.04; N, 5.65.

*Anhydro-N-trityl-6-aminopenicillanic acid.*—Potassium N-trityl-6-aminopenicillanate monohydrate (25.7 g., 0.05 mole) was converted to the acid chloride by reaction at —40° C. in 340 ml. $CH_2Cl_2$ containing 20.1 ml. (0.25 mole) pyridine with thionyl chloride (9.05 ml., 0.125 mole) for about 3 hours. Triethylamine (42 ml., 30.3 g., 0.3 mole) was then added in 100 ml. $CH_2Cl_2$ over one hour. Characteristic anhydro bands at 5.9 and 6.1μ then appeared in the infrared absorption spectrum but disappeared from an aliquot which had been shaken with water.

An additional 7.0 ml. (0.05 mole) triethylamine was added to the reaction mixture and stirring was continued for ninety minutes. The mixture was evaporated to dryness and the residue was triturated with ether and the mixture was filtered. The filtrate was evaporated to dryness to leave a new residue which was again extracted with ether and this ether extract was filtered and evaporated to dryness leaving a final residue which contained pyridine. This final residue was dissolved in benzene and the solution was again evaporated to dryness to leave a residue to which isopropyl alcohol (300 ml.) was then added; the mixture was stirred at 40° C. until solution was obtained. On standing in the cold there was precip-

17 itated 1.5 g. solid, orange anhydro-N-trityl-6-aminopenicillanic acid having the structure

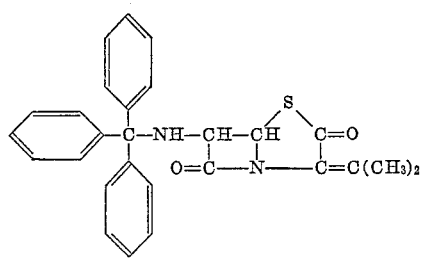

Additional product was obtained by concentrating the mother liquor and allowing it to stand; the total yield was 5.07 g. Trituration with glacial acetic acid gave the product as white crystals, M.P. 164–166° C.

*Analysis.*—Calc'd for $C_{27}H_{24}N_2O_2S$: C, 73.60; H, 5.45; N, 6.35; S, 7.28. Found: C, 73.55; H, 5.57; N, 6.00; S, 7.00.

A hydrated form of the same product was obtained from the mother liquors and found to melt at 134–135° C. but, after resolidification, to melt at 162–165° C.

*Analysis.*—Calc'd for $C_{27}H_{24}N_2O_2S \cdot \frac{1}{2}H_2O$: C, 72,3; H, 5.58; N, 6.25. Found: C, 72.30; H, 5.61; N, 5.88.

*Anhydro-6-aminopenicillanic acid.*—A solution containing 1.45 millimoles hydrogen chloride per ml. dioxane was prepared from 10.55 g. dry hydrogen chloride and 200 ml. dioxane.

A solution of 220 mgm. (0.5 millimole) anhydro-N-trityl-6-aminopenicillanic acid in 8 ml. diethyl ether was cooled in ice and to it was added 1.0 ml. (1.45 millimole) of the solution of hydrogen chloride in dioxane. After ninety minutes the product, anhydro-6-aminopenicillanic acid hydrochloride, having the structure

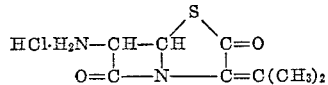

which precipitated was collected by filtration and found to exhibit infrared absorption maxima indicating the presence of $NH^+$ (3.2–4.0$\mu$), $\beta$-lactam (5.6$\mu$), thiolactone (5.9$\mu$) and $C=C$ (6.1$\mu$) and the complete absence of phenyl (6.3$\mu$, 13.3$\mu$, 14.2$\mu$).

An additional experiment gave a sample of this product which melted with decomposition at 137–139° C.

*Example XVII.—Antibacterial agent obtained from anhydro-alpha-phenoxyethylpenicillin by reaction with mercuric acetate*

Anhydro - alpha - phenoxyethylpenicillin (3.0 g.) and mercuric acetate (30 g.) in 150 ml. benzene were refluxed with stirring under nitrogen for two hours. The mixture was then filtered and the solids were washed with 100 ml. benzene. The combined benzene filtrates were shaken with a solution of one gram sodium bicarbonate in 150 ml. water and the resulting emulsion was broken by standing for 24 hours. The benzene phase was separated, dried over anhydrous $Na_2SO_4$, filtered and evaporated to dryness to leave a solid residue. Trituration of this solid in ether gave an ethereal solution which was evaporated to dryness to give a second solid residue. Trituration with ether of the second solid residue gave a white crystalline solid of M.P. 145–147° C. which was unchanged anhydro-alpha-phenoxyethylpenicillin and a final ethereal solution. Evaporation to dryness of the final ethereal solution gave the crude, antibacterially active product as a fluffy yellow powder, 1.4 g.

This material (0.65 g.) was dissolved in 5 ml. benzene and chromatographed on 6.5 g. of neutral $Al_2O_3$. Elution with benzene gave a yellow material travelling with the front. The first 10 ml. eluate were collected and evaporated to dryness to leave a solid residue which after trituration with ether was found to be a yellow crystalline

18 solid, M.P. 148–149° C. which was identified as being mainly unchanged starting material. The ethereal filtrate from the trituration was concentrated slightly and diluted with pentane to obtain the antibacterially active product as a white solid.

*Analysis.*—Calc'd for $C_{17}H_{16}N_2O_5S \cdot H_2O$: C, 53.9; H, 4.75; N, 7.45. Found: C, 53.65; H, 4.61; N, 7.68.

The product did not contain mercury and its infrared absorption spectrum exhibited maxima at 5.58$\mu$ ($\beta$-lactam), 5.9$\mu$ (lactone), 6.12$\mu$ (amide or $C=N$) and a shoulder at 6.12$\mu$ ($C=C$).

The Minimum Inhibitory Concentration (M.I.C.) in mcg./ml. in vitro of the product against certain bacteria was as follows:

| Organism: | M.I.C. in mcg./ml. |
|---|---|
| Staph. aureus Smith | 0.5 |
| Staph. aureus Smith after penicillinase treatment | 0.39 |
| S. aureus 1633-2 (benzylpenicillin resistant) | 3.13 |
| S. aureus 52-75 (benzylpenicillin resistant) | 12.5 |
| Kleb. pneum. | 3.13 |

The product is thus a highly active antibacterial agent which is penicillinase-resistant.

The same product was isolated using either carbon tetrachloride or pyridine as the solvent. The product possessed an ultra-violet absorption maximum near 320 m$\mu$. In the process of preparing this product, treatment of the benzene solution with sodium bisulfite, e.g., in water, before isolation insures the production of a mercury-free product.

As a matter of theory only, which is not essential to the invention, the product has been tentatively assigned the following structure:

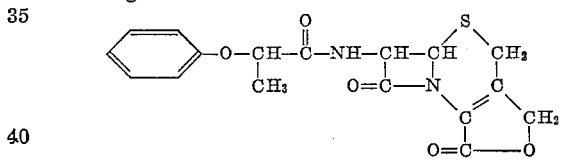

*Example XVIII*

When the reaction described above in Example XVII was carried out *using a reaction time of less than two hours,* there was isolated in about 50% yield as a crystalline solid the compound having the structure

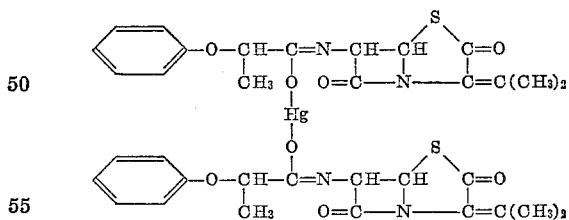

*Analysis.*—Calc'd for $C_{34}H_{34}N_4O_8S_2Hg$: C, 45.7; H, 3.82; N, 6.28. Found: C, 45.70; H, 4.08; N, 6.15.

This product is antibacterially inactive. Treatment of it with glacial acetic acid regenerates anhydro-alpha-phenoxyethylpenicillin. It was recovered in 60% yield after refluxing for two hours in benzene and in 32% yield after refluxing for two hours in toluene; in each case the only other products isolated were mercury and anhydro-alpha-phenoxyethylpenicillin. This product is useful as a starting material for the production of the product of Example XVII, e.g., by treatment with excess mercuric acetate.

I claim:

1. Anhydro-6-aminopenicillanic acid having the structure

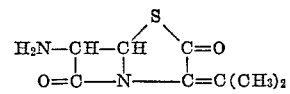

2. Anhydro-6-N-tritylaminopenicillanic acid having the structure

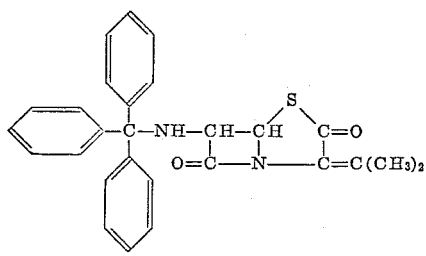

3. Anhydro-alpha-phenoxyethylpenicillin having the structure

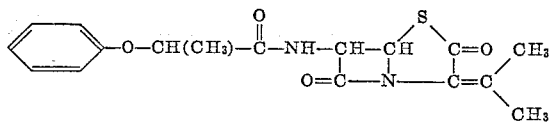

4. Anhydrobenzylpenicillin having the structure

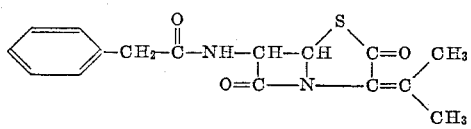

5. Anhydro-2-methoxyisopropylpenicillin having the structure

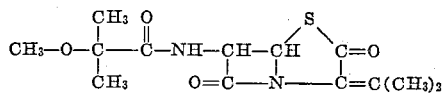

6. Anhydro-2-carboxyphenylpenicillin having the structure

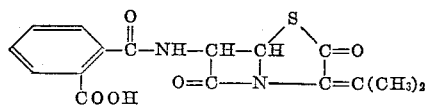

7. Anhydro-ω-carboxybutylpenicillin having the structure

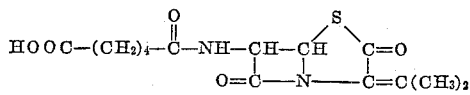

8. Anhydro-2,6-dimethoxyphenylpenicillin having the structure

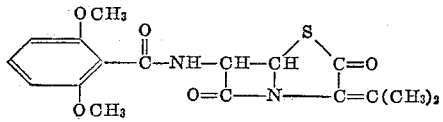

9. A compound having the formula

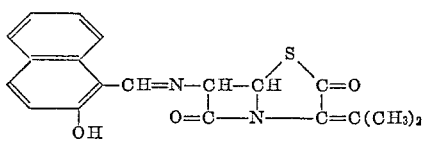

10. A compound having the formula

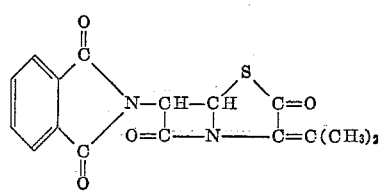

11. The process for preparing anhydro-alpha-phenoxyethylpenicillin which comprises mixing about 1 mole of alphaphenoxyethylpenicillin acid chloride with from about 1 to 3 moles of triethylamine at a temperature of from about −40° C. to about 25° C. in methylene chloride.

12. The process of preparing anhydrobenzylpenicillin which comprises mixing about 1 mole of benzylpenicillin acid chloride with from about 1 to 3 moles of triethylamine at a temperature of from about −40° C. to about 25° C. in methylene chloride.

13. The process for the preparation of an antibacterial agent which comprises heating a mixture of anhydro-alpha-phenoxyethylpenicillin, mercuric acetate and benzene for at least two hours.

References Cited by the Examiner

Hackh's Chemical Dictionary, p. 21 (1937), second edition.

Jour. Amer. Med. Assoc., p. 466, May 24, 1958.

Morton: The Chemistry of Heterocyclic Compounds, p. VI of the preface (1946).

References Cited by the Applicant

FOREIGN PATENTS 758,653  10/1956  Great Britain.

OTHER REFERENCES

D. A. Johnson: J. Amer. Chem. Soc., 75, 3636–3637 (1953).

Saul Wolfe et al.: J. Amer. Chem. Soc., 85, 643–644 (1963).

ALEX MAZEL, Primary Examiner.

N. S. RIZZO, J. W. ADAMS, Assistant Examiners.